United States Patent
Eckert

(10) Patent No.: US 10,503,640 B2
(45) Date of Patent: Dec. 10, 2019

(54) SELECTIVE DATA RETRIEVAL BASED ON ACCESS LATENCY

(71) Applicant: ADVANCED MICRO DEVICES, INC., Santa Clara, CA (US)

(72) Inventor: Yasuko Eckert, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/960,875

(22) Filed: Apr. 24, 2018

(65) Prior Publication Data

US 2019/0324906 A1 Oct. 24, 2019

(51) Int. Cl.
*G06F 12/0811* (2016.01)

(52) U.S. Cl.
CPC .. *G06F 12/0811* (2013.01); *G06F 2212/1021* (2013.01); *G06F 2212/1024* (2013.01); *G06F 2212/608* (2013.01)

(58) Field of Classification Search
CPC ......... G06F 12/0811; G06F 2212/1021; G06F 2212/1024; G06F 2212/608
See application file for complete search history.

(56) References Cited

U.S. PATENT DOCUMENTS

| 2015/0127907 A1* | 5/2015 | Fahim | G06F 12/0813 711/120 |
| 2017/0371777 A1* | 12/2017 | Kim | G06F 3/0604 |

OTHER PUBLICATIONS

U.S. Appl. No. 15/358,318, filed Nov. 22, 2016 in the name of David A. Roberts, et al.

\* cited by examiner

*Primary Examiner* — David Yi
*Assistant Examiner* — Dustin B. Fulford

(57) ABSTRACT

A processor includes multiple processing units (e.g., processor cores), with each processing unit associated with at least one private, dedicated cache. The processor is also associated with a system memory that stores all data that can be accessed by the multiple processing units. A coherency manager (e.g., a coherence directory) of the processor enforces a specified coherency scheme to ensure data coherency between the different caches and between the caches and the system memory. In response to a memory access request to a given cache resulting in a cache miss, the coherency manager identifies the current access latency to the system memory as well as the current access latencies to other caches of the processor. The coherency manager transfers the targeted data to the given cache from the cache or system memory having the lower access latency.

20 Claims, 4 Drawing Sheets

SELECTIVE DATA RETRIEVAL BASED ON ACCESS LATENCY

STATEMENT OF SPONSORED RESEARCH

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

Description of the Related Art

To enhance processing speed and efficiency, modern processing systems typically include multiple processing units that concurrently execute instructions. In some processors, the different processing units can be dedicated to different types of operations. For example, some processing systems include multiple processor cores to execute general processing operations and further include processing units specially designed to execute graphics operations, digital signal processing operations, or other special-purpose operations. The different processing units are supported by a memory hierarchy that stores data for the different processing units, whereby the memory hierarchy includes one or more caches dedicated to corresponding processing units, and a system memory (also referred to as "main memory") that stores data available to all the processing units. The processing system implements a specified memory management scheme to govern how data is shared between the different processing units and the different caches of the cache hierarchy. However, conventional memory management schemes can require data to be moved between the caches and the processing units, relatively inefficiently, and can negatively impact the overall processing efficiency of the processing system.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
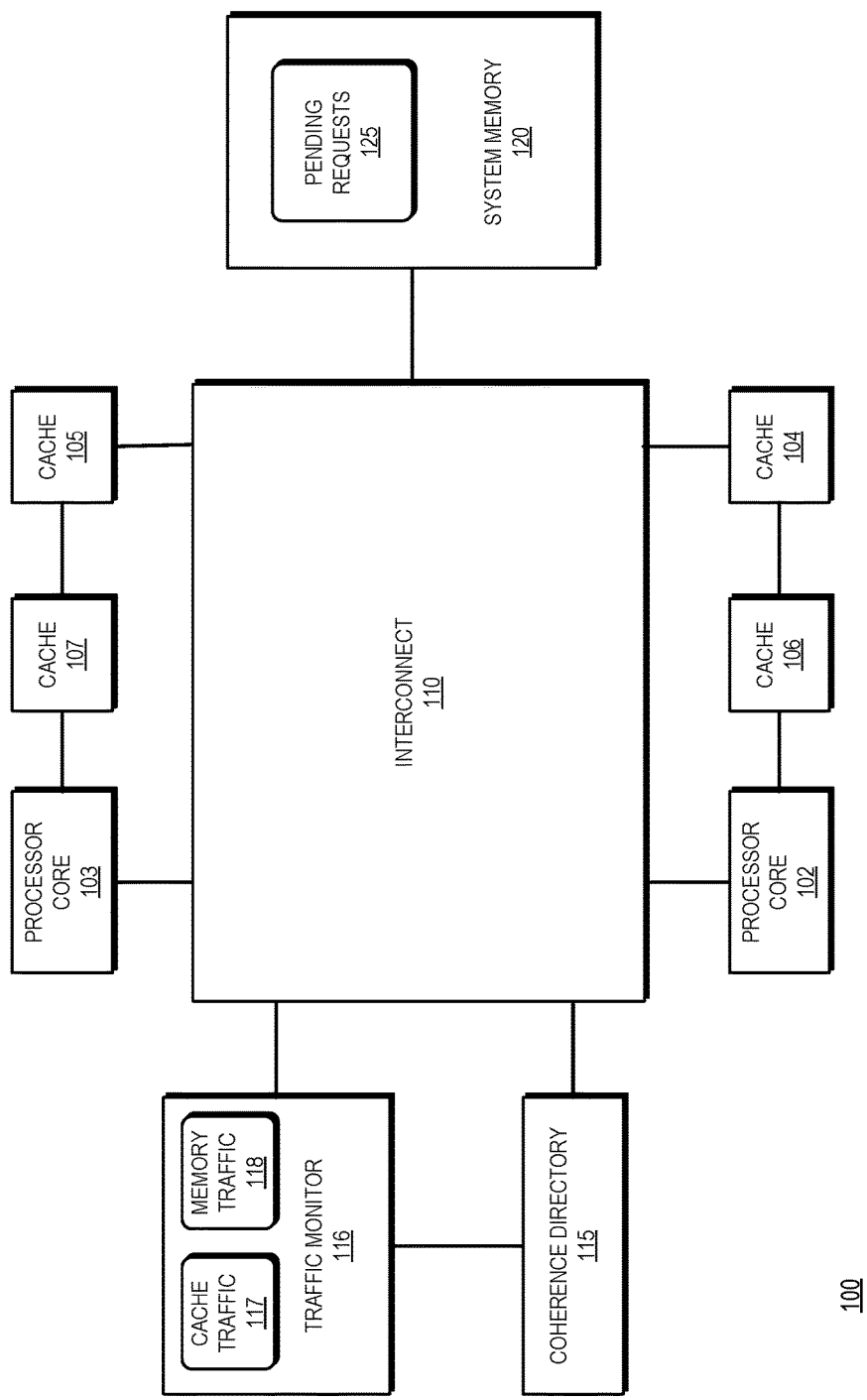
FIG. 1 is a block diagram of a processing system that selectively transfers data from one of a cache and system memory based on estimated access latencies in accordance with some embodiments.

FIGS. 1-4 illustrate techniques for selectively transferring data to a processor cache from one of another cache of the processor or a system memory based on dynamically estimated access latencies. The processor includes multiple processing units (e.g., processor cores), with each processing unit associated with at least one private, dedicated cache. The processor is also associated with a system memory that stores all data available to be accessed by the multiple processing units. A coherency manager (e.g., a coherence directory) of the processor enforces a specified coherency scheme to ensure data coherency between the different caches and between the caches and the system memory. In response to a memory access request to a given cache resulting in a cache miss, the coherency manager identifies the current access latency to the system memory as well as the current access latencies to other caches of the processor. The coherency manager transfers the targeted data to the given cache from the cache or system memory having the lower access latency, thus reducing memory access latency and improving processor performance.

To illustrate via an example, in some embodiments the processor includes one or more performance monitors to identify latency characteristics for the system memory as well as for a designated subset of caches (such as the last level caches (LLCs)) of the processor. Examples of such latency characteristics include an amount of interconnect traffic associated with the system memory or a given cache, a number of pending memory access requests, and the like. Based on the latency characteristics, the coherency manager maintains a current access latency for the system memory and for each cache. In response to a cache miss, the coherency manager identifies which, if any, of the other processor caches store the data targeted by the memory access request. If one of the identified cache lines is in a modified ("dirty") state, the coherency manager transfers the data from the cache having the modified cache line. If none of the identified cache lines are in the modified state, the coherency manager identifies the current access latency for each cache that stores the data, as well as the current access latency for the system memory. The coherency manager selects the memory unit (cache or system memory) having the lowest access latency and transfers the data from the selected memory unit.

In contrast to the techniques described herein, conventional processors transfer data between caches in a fixed manner. For example, some conventional processors, in response to a cache miss, always transfer data from another cache if the data is available at the cache, and only transfer the data from system memory when the data is not available at another cache. Using the techniques described herein, the processor is able to better adapt to changing conditions at the processor, and in particular to select for data transfer from the memory unit having the lowest access latency under the current operating conditions.

FIG. 1 illustrates a block diagram of a processing system 100 that selectively transfers data from one of a cache and system memory based on estimated access latencies in accordance with some embodiments. The processing system 100 is generally configured to execute sets of instructions (e.g., computer programs) to carry out specified tasks for an electronic device. Examples of such tasks include controlling aspects of the operation of the electronic device, displaying information to a user to provide a specified user experience, communicating with other electronic devices, and the like. Accordingly, in different embodiments the processing system 100 is employed in one of a number of types of electronic device, such as a desktop computer, laptop computer, server, game console, tablet, smartphone, and the like.

To support execution of the sets of instructions, the processing system 100 includes a plurality of processor cores (e.g., processor cores 102 and 103). In some embodiments, each processor core includes one or more instruction pipelines to fetch instructions, decode the instructions into corresponding operations, dispatch the operations to one or more execution units, execute the operations, and retire the operations. In addition, in some embodiments different processor cores are configured to execute particular types of instructions. For example, in some embodiments one or more of the processor cores are configured as central processing units (CPUs) to execute general instructions, while one or more other processor cores are configured as graphics processing units (GPUs) to execute graphics instructions associated with, for example, the construction and presentation of images.

To support the manipulation of data at the processor cores, the processing system 100 includes a memory hierarchy having a plurality of caches (e.g., caches 104 and 105) and a system memory 120. The caches are generally configured to store data that is expected to be accessed in the relatively near future by at least one of the processor cores. In some embodiments, the memory hierarchy is organized such that each processor core includes at least one local cache from which it accesses data. Thus, in the example of FIG. 1, the cache 104 is a local cache for the processor core 102 and the cache 105 is a local cache for the processor core 103. It will be appreciated that in some embodiments each processor core has additional local caches (e.g. caches 106 and 107). The local caches form a local cache hierarchy for the corresponding processor core. Thus, in the example of FIG. 1, caches 104 and 106 form a local cache hierarchy for the processor core 102 and the caches 105 and 107 form a local cache hierarchy for the processor core 103.

The memory hierarchy of the processing system 100 is associated with a memory address space that indicates the locations where data is stored at the memory hierarchy. Each processor core accesses data at the memory hierarchy of the processing system 100 by generating operations, referred to as memory access requests, wherein each memory access request includes a memory address of the data targeted by the memory access request. Examples of memory operations include write requests to modify data stored at the memory hierarchy and read requests to retrieve data from the memory hierarchy.

In response to a memory access request, the memory hierarchy satisfies the memory access request by traversing the local cache hierarchy as follows. The processor core provides the memory access request to the lowest level cache of its corresponding local cache hierarchy, referred to as the L1 cache for purposes of description. If the L1 cache includes an entry assigned to the memory address targeted by the memory access request, the cache indicates a cache hit and satisfies the memory access request by providing data stored at the entry to the processor core (if the request is a read request) or by storing data at the entry (if the request is a write request).

If the L1 cache does not include an entry assigned to the memory address, the cache indicates a cache miss and provides the memory access request to the next higher-level cache of the local cache hierarchy, referred to for purposes of description as the L2 cache. If the L2 cache includes an entry assigned to the targeted memory address, the next-higher level cache provides the data stored at the entry to the L1 cache, which assigns an entry to the corresponding memory address and stores the data at the assigned entry. The L1 cache then satisfies the memory access request. In response to a cache miss at the L2 cache, the memory access request is provided to the next-higher level cache of the local cache hierarchy. The traversal continues in a similar fashion until the memory access request reaches the last-level cache (LLC) of the local cache hierarchy. In response to a cache miss at the LLC, the data targeted by the memory access request is transferred to the LLC from one of the system memory 120 and an LLC that is local to another processor core.

As described further below, the processing system 100 is configured to select one of the system memory 120 and another LLC to transfer the data based at least in part on estimated latency of transferring the data from each source. In particular, the processing system 100 selects the one of the system memory 120 and another LLC based on which source is expected to have the lower latency in transferring the data, wherein the expected latency is based on dynamic conditions at the processing system 100, including factors such as the number of pending memory access requests (illustrated as pending requests 125) at the system memory 120.

Returning to the memory hierarchy of the processing system 100, to maintain data coherency between the different processor cores, the processing system 100 includes a coherency manager to enforce a specified data coherency protocol, such as a Modified-Owned-Exclusive-Shared-Invalid (MOESI) protocol. In the illustrated example of FIG. 1, the coherency manager is a coherence directory 115, but it will be appreciated that in other embodiments other coherency managers are used. In addition, it will be appreciated that the coherence directory 115 is described herein as a single module, but in other embodiments the operations of the coherence directory 115 are distributed among multiple coherence directories or other coherency managers.

The coherence directory 115 identifies and manages the coherency states for each memory address of the memory hierarchy, and enforces the specified data coherency protocol for the processing system 100. For example, in response to a memory access request being generated at a processor core, the corresponding L1 cache provides a coherency probe to the coherence directory 115. In response to the coherency probe, the coherence directory 115 performs a set of operations as specified by the data coherency protocol. The set of operations includes one or more of: 1) identifying a current coherency status for the memory address targeted by the memory access request; 2) sending coherency invalidation messages to one or more caches of the processing system 100 to ensure an exclusive access to the memory address; 3) transferring data between LLCs of the different processor cores; and 4) transferring data between the system memory 120 and the LLCs.

To facilitate the transfer of data between LLCs and between the system memory and the LLCs, the processing system 100 includes an interconnect 110. In some embodiments, the interconnect 110 is a point-to-point communication fabric generally configured to transfer data between modules connected to the communication fabric. Thus, in different embodiments the interconnect 110 is a crossbar switch or other fabric that complies with a specified communication protocol, such as an Infinity Fabric interconnect, a Peripheral Component Interconnect Express (PCI-E) fabric, a HyperTransport™ fabric, a QuickPath fabric, and the like. The coherence directory 115 transfers data between the LLCs and between the system memory and the LLCs by sending transfer requests to the LLCs and the system memory 120 via the interconnect 110. The LLCs and the system memory also use the interconnect 110 to satisfy the data transfer requests, including sending the requested data to the requested destination via the interconnect 110.

It will be appreciated that, as data is moved between different portions of the memory hierarchy and over the interconnect 110, the latency with which a memory access request, including a request to transfer data, is able to be satisfied at a particular cache or at the system memory 120 will vary. For example, the latency with which a memory data transfer request is able to be satisfied at the cache 104 depends on the number of memory access requests that are pending at the cache 104, the congestion of the interconnect 110 with respect to the cache 104 (e.g., the number of communications to or from the cache 104 being handled by the interconnect 110 at a give point in time) and the like. To monitor these changing conditions, and associated changing latencies, the processing system 100 includes a traffic monitor 116. In some embodiments, the traffic monitor 116 is a performance monitor that keeps track of different dynamic conditions at the memory hierarchy of the processing system 100, including cache traffic 117, indicating the amount of memory access request traffic at each LLC (e.g., caches 104 and 105) or awaiting transfer to each LLC via the interconnect 110.

The dynamic conditions monitored by the traffic monitor 116 further includes memory traffic 118, indicating the number of pending requests 125 and the amount of memory access request traffic awaiting transfer to the system memory 120 via the interconnect 110. The traffic monitor 116 updates each of the cache traffic 117 and the memory traffic 118 as conditions at the processing system 100 change, including as new memory access requests are provided to or satisfied at a given LLC or at the system memory 120. In some embodiments, the traffic monitor 116 updates the cache traffic 117 and the memory traffic 118 at periodic intervals, rather than as each memory access request is provided or satisfied, thereby reducing the overhead for monitoring the memory access traffic.

In operation, in response to a memory access request causing cache miss at an LLC, the coherence directory 115 determines if the data targeted by the memory access request is stored at another LLC. If so, the coherence directory 115 requests from the traffic monitor 116 the most recent latency for the LLC that stores the targeted data and the most recent latency for the system memory 120. In some embodiments, the latencies are each based on a combination of a fixed latency value associated with fixed conditions at the processing system 100, such as a distance between the LLCs, and a dynamic latency value associated with changing conditions at the processing system 100, such as congestion at the interconnect 110. In some embodiments, if none of the LLCs stores the data in a modified state, the coherence directory 115 then transfers the data from the source that has the lower latency.

In some other embodiments, the coherence directory 115 compares the latency associated with the LLC to a fixed threshold value, representing a fixed expected latency associated with the system memory 120. In response to the latency associated with the LLC being lower than the threshold value, the coherence directory 115 forwards the memory access request to the LLC. In response to the latency associated with the LLC being greater than the threshold value, the coherence directory 115 forwards the memory access request to the system memory 120. The coherence directory 115 thus reduces the latency of the memory access request based on the current or recent operating conditions of the processing system 100, thereby improving processing efficiency.

Figure 2:
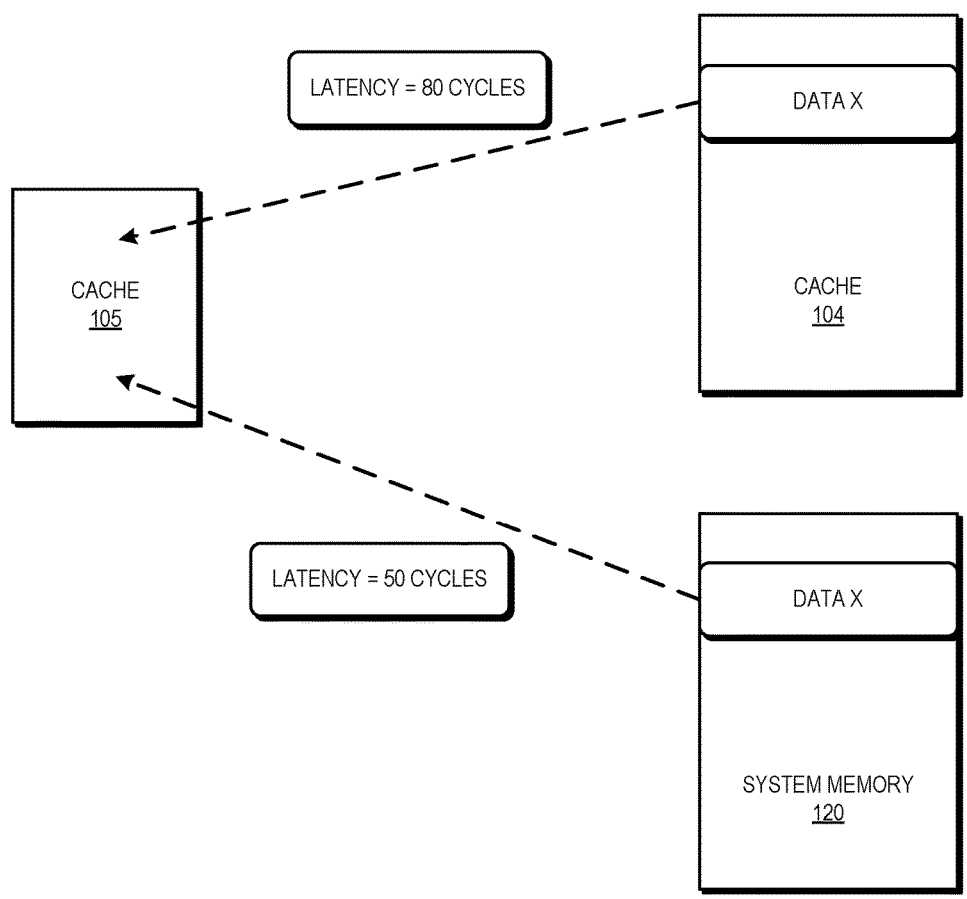
FIG. 2 is a diagram illustrating an example of the processing system of FIG. 1 selectively transferring data from system memory instead of a cache based on estimated access latencies in accordance with some embodiments.

FIG. 2 illustrates an example of the coherence directory selecting between a cache and the system memory 120 in accordance with some embodiments. In the depicted example, it is assumed that the cache 105 has received a memory access request targeting a memory address associated with data designated "DATA X". It is further assumed that the cache 105 does not store DATA X, and therefore has indicated a cache miss. In response to the cache miss at the cache 105, the coherence directory 115 determines that the cache 104 includes an entry that stores DATA X in an unmodified state. Accordingly, the coherence directory 115 identifies that the cache 104 has a current or recent latency of 80 cycles, wherein the cycles correspond to clock cycles of a clock signal employed to synchronize operations at the processing system 100. In addition, the coherence directory 115 identifies that the system memory 120 has a current or recent latency of 50 cycles. Thus, the coherence directory 115 determines, based on the estimated latencies, that it will take longer to transfer DATA X to the cache 105 from the cache 104 than from the system memory 120. Accordingly, the coherence directory 115 forwards the memory access request to the system memory 120. In response to the memory access request, the system memory 120 transfers DATA X to an entry of the cache 105.

Figure 3:
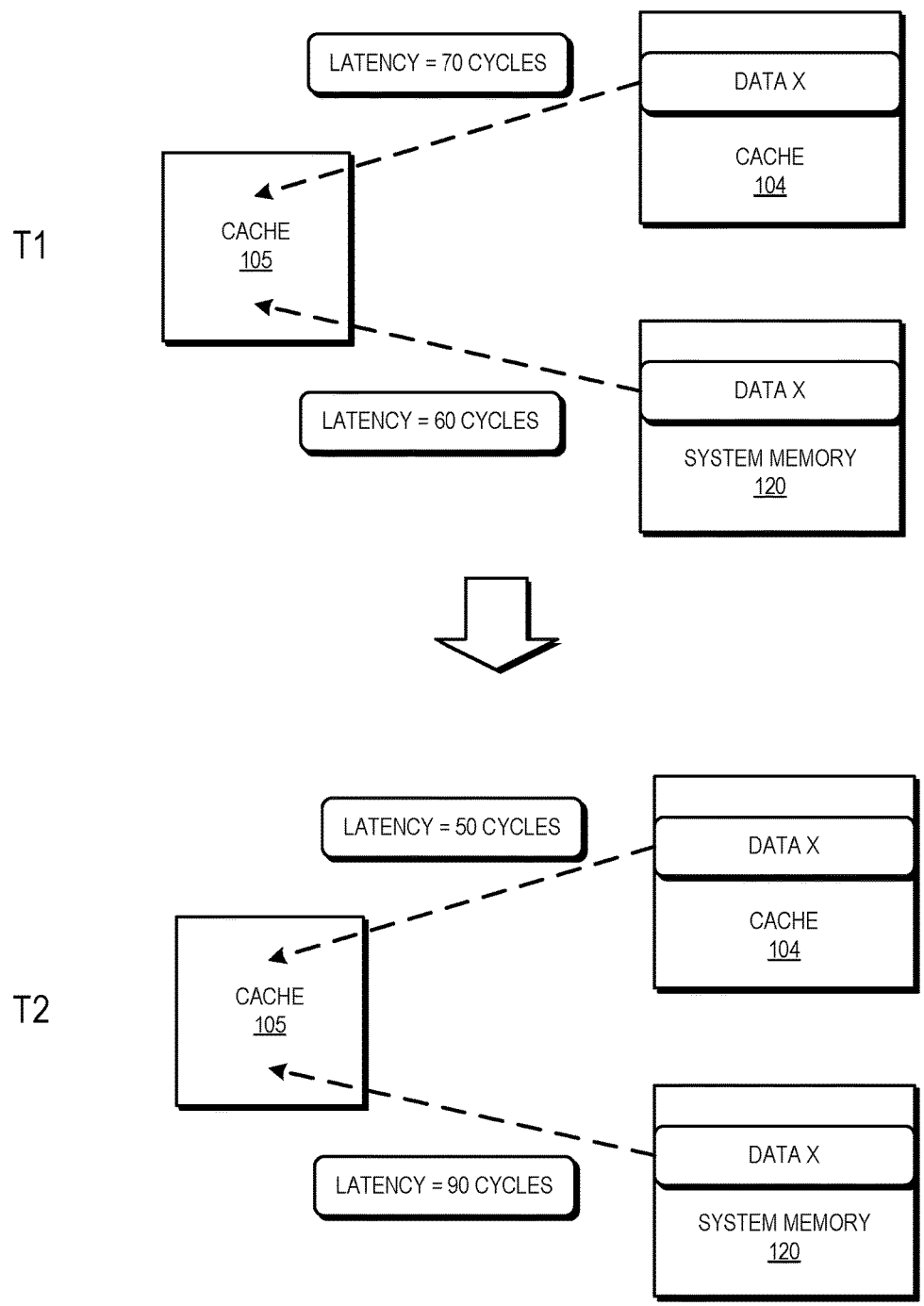
FIG. 3 is a diagram illustrating an example of the processing system of FIG. 1 selectively transferring data from system memory or a cache based on estimated access latencies at different times in accordance with some embodiments.

It will be appreciated that the relative latencies associated with the different caches and the system memory 120 change over time as conditions at the processing system 100 change. Examples of such changing conditions include congestion at the interconnect 110, the number of pending memory access requests at the caches and at the system memory 120, and the like. An example of changes in the relative latencies is illustrated at FIG. 3 in accordance with some embodiments. The illustrated example illustrates two different points in time, designated T1 and T2 respectively. At time T1 a cache miss has occurred at the cache 105 based on a memory access request targeting DATA X. In response to the cache miss at the cache 105, the coherence directory 115 determines that the cache 104 includes an entry that stores DATA X in an unmodified state. The coherence directory 115 identifies that the cache 104 has a current or recent latency of 70 cycles. In addition, the coherence directory 115 identifies that the system memory 120 has a current or recent latency of 60 cycles. Thus, the coherence directory 115 determines, based on the estimated latencies, that it will take longer to transfer DATA X to the cache 105 from the cache 104 than from the system memory 120. Accordingly, the coherence directory 115 forwards the memory access request to the system memory 120. In response to the memory access request, the system memory 120 transfers DATA X to an entry of the cache 105.

At the time T2, a cache miss has again occurred at the cache 105 based on a memory access request targeting DATA X. In response to the cache miss at the cache 105, the coherence directory 115 determines that the cache 104 includes an entry that stores DATA X in an unmodified state. The coherence directory 115 identifies that the cache 104 has a current or recent latency of 50 cycles. In addition, the coherence directory 115 identifies that the system memory 120 has a current or recent latency of 90 cycles. In other words, due to changing conditions at the processing system 100, including, for example, changes in the number of memory access requests pending at the system memory 120, the relative latencies at time T2 are different from the relative latencies at time T1, such that at time T2 it will take longer to transfer DATA X to the cache 105 from the system memory 120 than from the cache 104. Accordingly, at or around time T2 the coherence directory 115 forwards the memory access request to the cache 104. In response to the memory access request, the cache 104 transfers DATA X to an entry of the cache 105.

Figure 4:
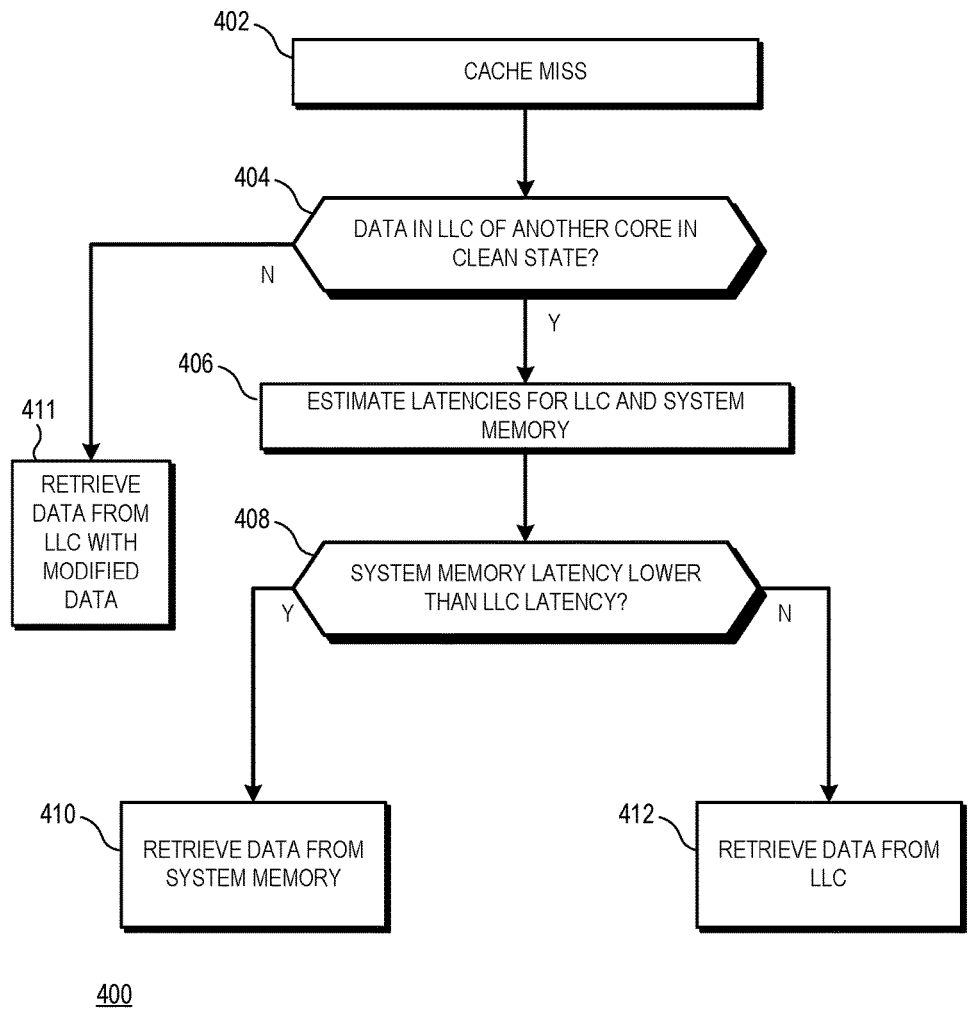
FIG. 4 is a flow diagram of a method of a processor selectively transferring data between one of a cache and system memory based on estimated access latencies in accordance with some embodiments.

FIG. 4 is a flow diagram of a method 400 of a processor selectively transferring data between one of a cache and system memory based on estimated access latencies in accordance with some embodiments. At block 402, in response to a memory access request, a cache miss occurs at an LLC of the processor (designated for purposes of description as "LLC-A"). In response, at block 404 a coherency manager (e.g., a coherence directory) of the processor determines whether an LLC of another processor core stores the data targeted by the memory access request in a clean (unmodified) state. If not, the method flow moves to block 411 and the coherency manager sends the memory access request to the LLC that stores the requested data in a dirty (modified) state. In response, the LLC transfers the data to an entry of the LLC where the cache miss occurred.

Returning to block 404, if the coherency manager determines that an LLC of another core (designated for purposes of description as "LLC-B") stores the data targeted by the memory access request in a clean (unmodified) state, the method flow proceeds to block 406 and the coherency manager identifies 1) the current or recent latency associated with transferring the targeted data from the system memory to the LLC-A (the "system memory latency"); and 2) the current or recent latency associated with transferring the targeted data from LLC-B to LLC-A (the "LLC latency"). In some embodiments, the coherency manager identifies both the system memory latency and the LLC latency based on monitored performance characteristics such as a number of memory access requests pending at the system memory, congestion at an interconnect of the processor, and the like.

At block 408, the coherency manager identifies if the system memory latency is lower than the LLC latency. If so, the method flow moves to block 410 and the coherency manager sends the memory access request to the system memory. In response, the system memory transfers the data to an entry of the LLC-A. If, at block 408, the coherency manager identifies that the LLC latency is lower than the system memory latency, the method flow proceeds to block 412 and the coherency manager sends the memory access request to the LLC-B. In response, the LLC-B transfers the data to an entry of the LLC-A.

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   in response to a first memory access request targeting first data associated with a first memory address, identifying a first cache miss at a first cache associated with a first processor core;
   in response to identifying the first cache miss, identifying a first latency associated with retrieving the first data from a second cache associated with a second processor core; and
   in response to identifying that the first latency exceeds a first threshold, satisfying the first memory access request at a system memory associated with the first processor core and the second processor core.

2. The method of claim 1, further comprising:
   in response to identifying that the first latency is less than the first threshold, satisfying the first memory access request at the second cache.

3. The method of claim 1, wherein the first threshold is based on a latency associated with retrieving data from the system memory.

4. The method of claim 1, wherein the first threshold is based on an expected latency to process memory access requests pending at the system memory.

5. The method of claim 1, wherein:
   identifying the first latency comprises identifying the first latency based on a combination of a predetermined fixed latency and a dynamic latency based on processor conditions.

6. The method of claim 1, wherein:
   identifying the first latency comprises identifying the first latency based on congestion at an interconnect between the second cache and the first cache.

7. The method of claim 1, further comprising:
   in response to identifying the first cache miss, identifying a second latency associated with retrieving the first data from a third cache associated with a third processor core; and wherein satisfying the first memory access request at the system memory comprises satisfying the first memory access request at the system memory in response to identifying that the first latency exceeds the first threshold and in response to identifying that the second latency exceeds the first threshold.

8. The method of claim 1, further comprising:
in response to a second memory access request targeting second data associated with a second memory address, identifying a second cache miss at the second cache;
in response to identifying the second cache miss, identifying a second latency associated with retrieving the second data from the first cache; and
in response to identifying that the second latency exceeds the first threshold, satisfying the second memory access request at the system memory.

9. A method, comprising:
identifying, at a first cache associated with a first processor core, a first cache miss at a first time and in response to a first memory access request targeting first data associated with a first memory address;
in response to the first cache miss:
identifying a first latency associated with retrieving the first data from a second cache associated with a second processor core; and
in response to identifying that the first latency exceeds a first threshold, providing the first memory access request to a system memory associated with the first processor core and the second processor core;
identifying, at the first cache, a second cache miss at a second time and in response to a second memory access request targeting second data associated with a second memory address;
in response to the second cache miss:
identifying a second latency associated with retrieving the second data from the second cache, the second latency different from the first latency; and
in response to identifying that the second latency is less than the first threshold, satisfying the second memory access request at the second cache.

10. The method of claim 9, wherein the first threshold is based on a latency associated with retrieving data from the system memory.

11. The method of claim 9, wherein the first threshold is based on an expected latency to process a number of memory access requests pending at the system memory.

12. The method of claim 9, wherein:
identifying the first latency comprises identifying the first latency based on a combination of a predetermined fixed latency and a dynamic latency based on processor conditions.

13. The method of claim 9, wherein:
identifying the first latency comprises identifying the first latency based on congestion at an interconnect between the second cache and the first processor core.

14. A processor, comprising:
a plurality of processor cores including a first processor core and a second processor core;
a plurality of caches, including a first cache associated with the first processor core and a second cache associated with the second processor core, the first cache to:
in response to a first memory access request targeting first data associated with a first memory address, identify a first cache miss; and
a coherency manager to:
in response to the first cache miss, identify a first latency associated with retrieving the first data from the second cache; and
in response to identifying that the first latency exceeds a first threshold, provide the first memory access request to a system memory associated with the first processor core and the second processor core.

15. The processor of claim 14, wherein the coherency manager is to:
in response to identifying that the first latency is less than the first threshold, satisfy the first memory access request at the second cache.

16. The processor of claim 14, wherein the first threshold is based on a latency associated with retrieving data from the system memory.

17. The processor of claim 14, wherein the first threshold is based on an expected latency to process a number of memory access requests pending at the system memory.

18. The processor of claim 14, wherein the coherency manager is to:
identify the first latency based on a combination of a predetermined fixed latency and a dynamic latency based on processor conditions.

19. The processor of claim 14, wherein the coherency manager is to:
identify the first latency based on congestion at an interconnect between the second cache and the first processor core.

20. The processor of claim 14, wherein the coherency manager is to:
in response to identifying the first cache miss, identify a second latency associated with retrieving the first data from a third cache associated with a third processor core; and
wherein satisfying the first memory access request at the system memory comprises satisfying the first memory access request at the system memory in response to identifying that the first latency exceeds the first threshold and in response to identifying that the second latency exceeds the first threshold.

* * * * *